United States Patent [19]
Chastain

[11] Patent Number: 6,021,943
[45] Date of Patent: Feb. 8, 2000

[54] PROCESS FOR EXECUTING PAYMENT TRANSACTIONS

[76] Inventor: Robert H. Chastain, 6995 Riverside Dr., Atlanta, Ga. 30328

[21] Appl. No.: 08/918,988

[22] Filed: Aug. 27, 1997

Related U.S. Application Data

[60] Provisional application No. 60/031,343, Nov. 21, 1996, and provisional application No. 60/028,017, Oct. 9, 1996.

[51] Int. Cl.[7] ................................................. G06F 15/00
[52] U.S. Cl. ............................ 235/379; 235/380; 902/40
[58] Field of Search ................................... 235/379, 380, 235/382, 382.5, 492; 902/40

[56] References Cited

U.S. PATENT DOCUMENTS

| | | | |
|---|---|---|---|
| 4,454,414 | 6/1984 | Benton | 235/379 |
| 4,837,422 | 6/1989 | Dethloff | 235/380 |
| 5,231,571 | 7/1993 | D'Agostino | 364/408 |
| 5,350,906 | 9/1994 | Brody | 235/379 |
| 5,478,993 | 12/1995 | Derksen | 235/380 |
| 5,506,397 | 4/1996 | Hoshino | 235/492 |
| 5,521,362 | 5/1996 | Powers | 235/380 |
| 5,534,683 | 7/1996 | Rankl | 235/380 |
| 5,544,246 | 8/1996 | Mandelbaum | 380/23 |
| 5,546,523 | 8/1996 | Gatto | 395/156 |
| 5,563,395 | 10/1996 | Hoshino | 235/380 |
| 5,623,547 | 4/1997 | Jones | 380/24 |

Primary Examiner—Donald Hajec
Assistant Examiner—Drew A. Dunn
Attorney, Agent, or Firm—Gardner & Groff, P.C.

[57] ABSTRACT

A process for executing payment transactions between a user and a merchant, the process being carried out in connection with a bank or other institution maintaining a financial account for the user. The process comprises a step of segmenting the financial account of the user into a first sub-account containing unrestricted funds and a second sub-account containing restricted funds and transferring funds from the first sub-account of unrestricted funds to the second sub-account of restricted funds. Preferably, the transferring of the funds is done periodically according to a predetermined budget or is done from time to time according to specific authorization. The process also comprises tendering a restricted funds bank card to the merchant for accessing restricted funds in the second sub-account and scanning the restricted funds bank card electronically to identify the account to be accessed. The process also comprises the step of communicating a payment request from the merchant to the bank or other institution, with the payment request identifying the account to be debited and the amount to be debited therefrom. Further, the process comprises evaluating the payment request and an instantaneous balance in the second sub-account of restricted funds, and, if the second sub-account has sufficient funds to cover the payment requested, debiting the second sub-account by the amount requested for payment to the merchant.

4 Claims, 3 Drawing Sheets

PROCESS FOR EXECUTING PAYMENT TRANSACTIONS

This application claims the benefit of U.S. Provisional Application Ser. Nos. 60/031,343 filed Nov. 21, 1996; 60/028,017 filed Oct. 9, 1996.

TECHNICAL FIELD

The present invention relates generally to banking and credit card processes.

BACKGROUND OF THE INVENTION

There are numerous non-cash techniques employed today for executing payment by a purchaser to a merchant. Indeed, numerous types of credit cards and banking cards are in widespread use. For example, the ubiquitous credit card can be used to pay a merchant, with the transaction being paid for by a credit card clearing house or bank and creating a credit obligation for the owner of the credit card. Another type of card which looks like a credit card but functions differently is the so-called debit card. The debit card is used much like a credit card in that it is tendered by the purchaser to a merchant for payment. Payment is effected from a bank to the merchant and the funds are deducted directly from the card holder's bank account.

As an alternative to cash, many banks are now offering so-called "cash cards". Cash cards require the purchase of a card which looks much like a credit card, but which has a limited amount of available value to be spent (the balance is contained in a computer chip in the card). As the cash card is used, the remaining balance on the card is depleted.

As an alternative to the use of credit cards or checks, many people still rely on the use of cash, but often need access to funds in a bank account after traditional banking hours. Automated teller machines (ATM) have allowed people to access funds on weekends and at night.

Each of these payment methods has certain drawbacks. For example, the use of ATM cards and ATM machines provide a substantial safety risk to the user inasmuch as people are often vulnerable to being robbed at ATM machines. Also, ATM cards do not provide any budgetary limits and do not report the actual usage of the funds (ATM cards do not show how the funds were spent, only showing how much funds were withdrawn from the bank account). Credit cards create debt obligations rather than drawing against actual funds contained in a bank account, thereby teaching poor budgetary habits. Furthermore, credit cards are not generally useful for use by minors inasmuch as minors are generally incapable of entering into a binding contract. This can make merchants reluctant to accept credit cards as tendered payment by creation of a credit obligation. However, debit cards do not contain a budgetary limit. Cash cards have the disadvantage of requiring that they be paid for in advance and are no more secure than cash.

Accordingly, it can be seen that a need yet remains for a payment method which allows budgetary limits to be imposed on spending, which prevents someone other than the account owner from emptying the bank account, and which provides good tracking of how the funds have been spent. It is to the provision of such a payment method that the present invention is primarily directed.

SUMMARY OF THE INVENTION

Briefly described, in a first preferred form the present invention comprises a process for executing payment transactions between a user and a merchant, the process being carried out in connection with a bank or other institution maintaining a financial account for the user. The process comprises segmenting the financial account of the user into a first sub-account containing unrestricted funds and a second sub-account containing restricted funds and transferring funds from the first sub-account of unrestricted funds to the second sub-account of restricted funds. Preferably, the transferring of the funds is done periodically according to a predetermined budget or is done from time to time according to specific authorization.

The process also comprises tendering a restricted funds bank card to the merchant for accessing restricted funds in the second sub-account and scanning the restricted funds bank card electronically to identify the account to be accessed. The process also comprises the step of communicating a payment request from the merchant to the bank or other institution, with the payment request identifying the account to be debited and the amount to be debited therefrom. Further, the process comprises evaluating the payment request and an instantaneous balance in the second sub-account of restricted funds, and, if the second sub-account has sufficient funds to cover the payment requested, debiting the second sub-account by the amount requested for payment to the merchant.

DETAILED DESCRIPTION OF THE PREFERRED EMBODIMENT

Figure 1:
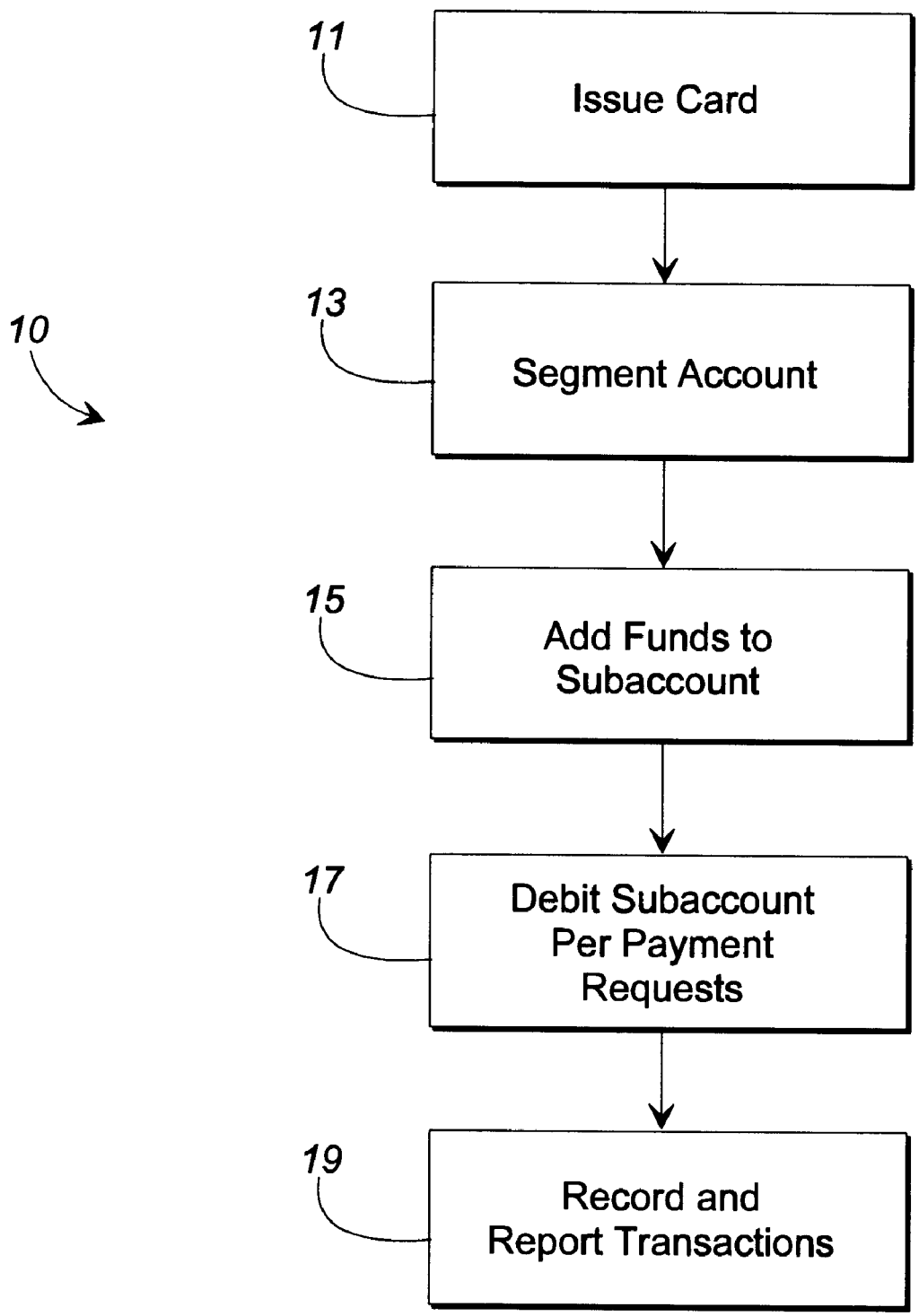
FIG. 1 is a schematic, process flow diagram of a process according to a preferred form of the present invention.

Referring now in detail to the drawing figures, wherein like reference numerals represent like parts throughout the several views, FIG. 1 shows a process 10 according to preferred form of the invention. The process 10 is for executing payment of the payment transactions between a user and a merchant and is carried out in connection with a bank or other financial institution maintaining a financial account for the user. To initiate the process 10, the bank would issue a restricted funds banking card. This is depicted by block 11 in FIG. 1. Secondly, the bank segments the financial account into two or more sub-accounts. This is depicted by block 13. One of the sub-accounts would operate in the same way that traditional bank accounts would operate in that the funds would be available for unrestricted access by the account owner. Thus, the account owner could deplete all the funds in a single transaction, for example. Conversely, the other of the sub-accounts would be a restricted funds sub-account. The funds maintained in the restricted fund sub-account have a restricted access such that funds can only be taken out of the account by use of the special restricted funds banking card. The restricted funds banking card is issued to the account holder or to a person authorized by the account owner to use the card. For example, the restricted funds banking card could be authorized to be used by a minor child of the account owner. Or, the restricted funds banking card could be authorized to be used by an employee of the account owner. Many different types of scenarios could be accommodated by the account owner authorizing a third party (whether a relative or not) to use the restricted funds banking card. Moreover, the account owner can designate himself or herself as the user of the restricted funds banking card.

A key feature of the restricted funds sub-account and the restricted funds banking card is that monies contained in the restricted funds sub-account can only be withdrawn by using the restricted funds banking card. Conversely, the restricted funds banking card can only access funds in the restricted funds sub-account and cannot access funds in the unrestricted funds sub-account. This provides excellent protection against the unrestricted funds being depleted by a third party authorized to use the restricted funds banking card.

After the card is issued as depicted in block 11 and the basic account segmented as depicted in block 13, typically, funds would be added to the restricted funds sub-account. This can be accomplished in a number of different ways. For example, the basic account can be designated to automatically and periodically transfer funds to the restricted funds sub-account to set up a set budget of available monies in the restricted funds sub-account. Alternatively, funds could be transferred from the unrestricted funds sub-account to the restricted funds sub-account on an as-needed basis and as authorized by the account owner.

In use, the restricted funds banking card is to be used at a business by the user. The business or merchant would then send the payment request to the bank (typically this payment request would be sent by electronic transmission) requesting that the bank credit or pay the merchant the amount identified in the payment request and to be withdrawn from the restricted funds sub-account associated with the account number corresponding to the restricted funds banking card. This is depicted in block 17 of FIG. 1. This is further described in more detail in connection with FIG. 2.

After receiving a payment request and processing the same to credit or otherwise pay the merchant, the computer system operated by the bank records the debit transaction from the restricted funds sub-account and calculates a new running balance for the restricted funds sub-account. At the end of the month, when the bank sends its monthly statement, the new statement should include a detailed description of transactions involving the unrestricted funds sub-account including a beginning and ending balance, as well as similar information for the restricted funds sub-account. This is depicted by block 19 of FIG. 1.

Figure 2:
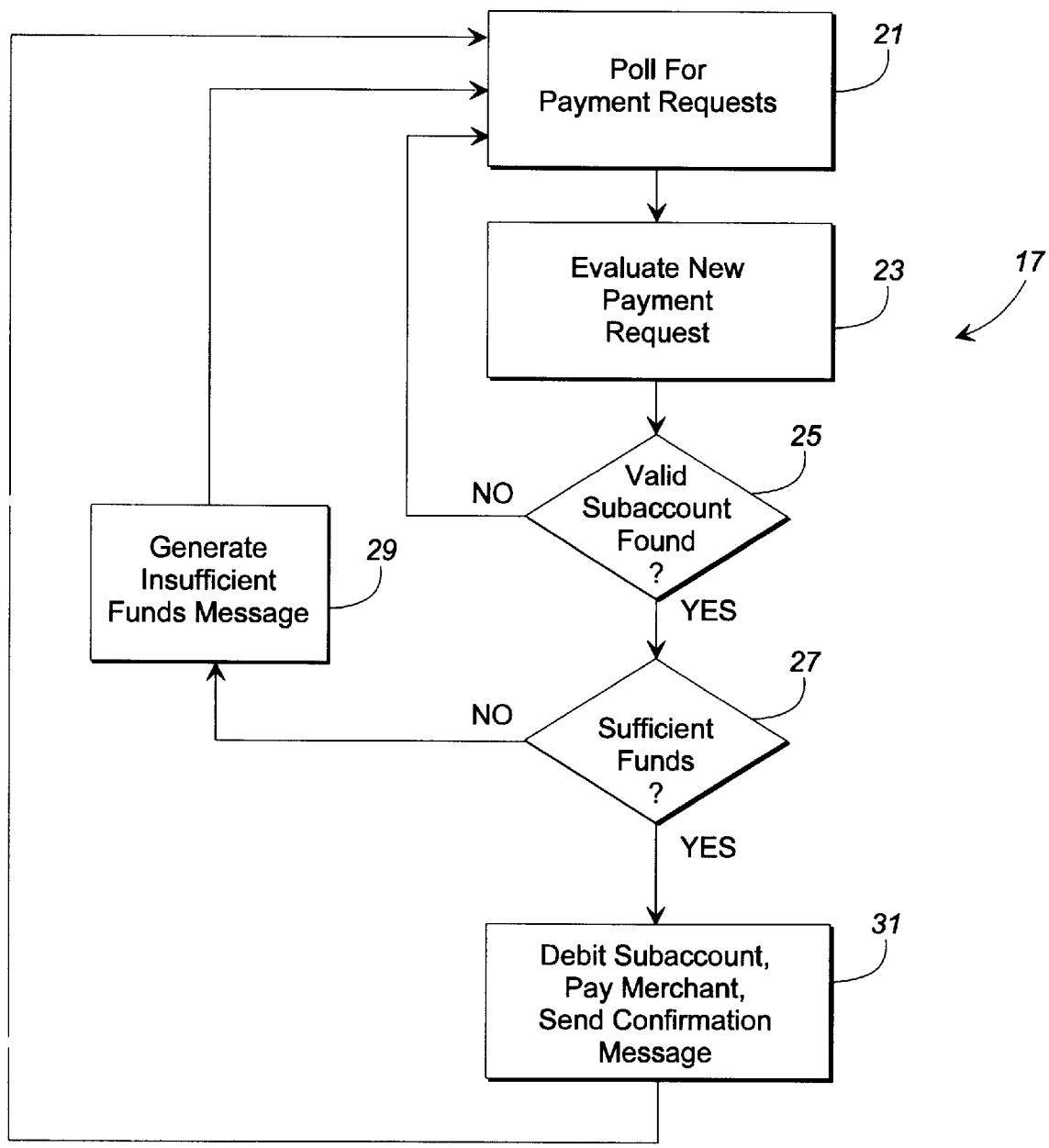
FIG. 2 is a schematic, process flow diagram of the process of FIG. 1.

FIG. 2 shows the operations of block 17 of FIG. 1 in greater detail. Specifically, FIG. 2 shows the steps involved in receiving and processing payment requests in connection with the restricted funds banking card. The computer system (not shown in this figure) maintained by the bank or card clearing house receives payment requests from merchants. This is accomplished by the polling function depicted in block 21 of FIG. 2. Once a payment request has been received, the payment request is evaluated according to block 23. Next, the payment request is further evaluated to determine if the payment is requested of a valid sub-account of restricted funds. This is depicted by decision block 25. If the payment request is not seeking payment from a valid sub-account containing restricted funds, then further processing of the payment request is terminated and the system returns to the polling function as indicated in the drawing figure. Optionally, an error message could be returned to the merchant indicating that payment was requested of an invalid account number. If the request for payment requests payment from a valid sub-account containing restricted funds, the next evaluation is of whether the sub-account contains sufficient funds to pay the amount requested. This is depicted by decision block 27 of FIG. 2. If the sub-account containing restricted funds does not have a balance sufficient to meet the payment requested, an insufficient funds message is generated and returned to the merchant. This is depicted by block 29 of FIG. 2. On the other hand, if the restricted funds sub-account does contain sufficient funds to meet the payment request, then the restricted funds sub-account is debited by the amount requested, the merchant is credited with the same amount (or otherwise paid) and a confirmation message is returned to the merchant. This is depicted by block 31 of FIG. 2.

Figure 3:
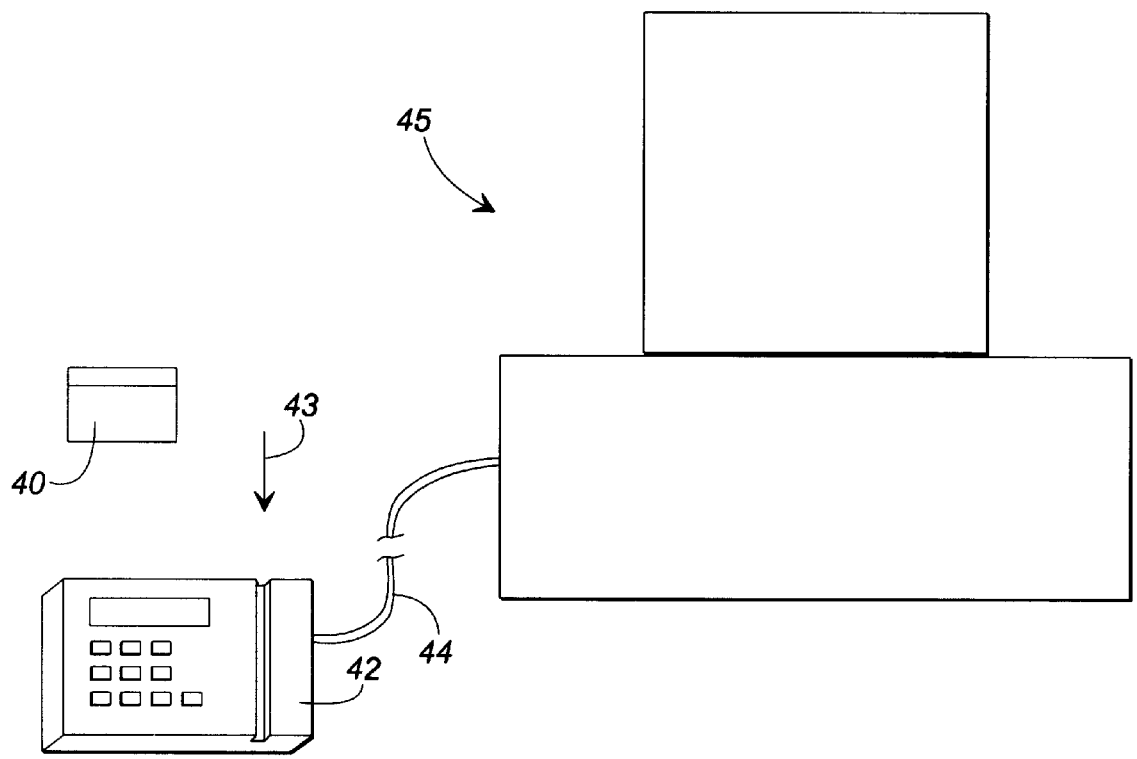
FIG. 3 is a schematic illustration of a physical arrangement for carrying out the process of FIG. 1.

FIG. 3 shows, in schematic form, a simplified mechanical arrangement for carrying out the payment process described above. As shown in FIG. 3, a restricted funds banking card 40 is to be tendered by the user to a merchant. The merchant would "swipe" the restricted funds banking card 40 throughout a conventional card reader 42 by moving it in the direction of direction arrow 43 through a slot formed in the card reader 42. The card reader is programed to recognize the restricted funds banking card by type and to generate a payment request to be transmitted to a bank or a card clearing house via electronic lines, such as electronic line 44 depicted in FIG. 3. Typically, this is done over phone lines, although other means can be employed. The card reader in this way is connected to a central computer, indicated generally at 45, which receives the transaction as a payment request and handles it accordingly as described above in connection with FIG. 1 and FIG. 2.

This payment process has numerous advantages. For example, the restricted funds banking card enables parents to predetermine the amount of money to which their children have access each month. The restricted funds banking card is also intended for use by dependents or other individuals who the primary account holders want to allow to spend a certain amount within a budget, including college students, elderly parents, or the primary account holders themselves. This also has ready application in situations involving divorcing couples where one of the divorcing individuals wants to provide funds on a regular basis for use by the other, without allowing the other divorcing spouse to have access to the unrestricted funds in the bank account. One important advantage of this process is that it allows the account owner to see exactly where the authorized user is spending the budgeted money. This has important social implications inasmuch as it would allow parents to monitor the spending patterns of their minor children to ensure that the money that the children are spending is being used for legitimate products and services and not for illegal activities, such as illicit drugs on the street. Furthermore, the restricted funds banking card tends to promote and teach responsible spending and budgeting procedures. Advantageously, the process involving the restricted funds banking card provides many of the conveniences and control features of a "cash card" with the security features of a debit card or credit card.

To get around the problem of a minor child not being able to enter into a binding contract, the restricted funds banking card shall contain two signatures on the back thereof. Firstly, the restricted funds banking card shall contain language and signature indicating that the account owner is a principal and that the authorized card user (whose signature also appears on the back of the card) is acting as an authorized agent of the principal. In this way, minor children can use the card to effect purchases of items and the merchant can be sure than an effective sales contract is executed thereby.

While the invention has been described above in connection with traditional checking accounts and savings accounts at banks, it will be apparent to those skilled in the art that other financial accounts can be employed in connection with the invention. For example, financial accounts at brokerage houses and other institutions can employ this invention. Furthermore, while the above describes the use of asset accounts (such as demand deposit accounts and money market accounts), other types of financial accounts can be used as well. For example, obligation (credit) accounts can be used. For example, credit card accounts can be used, with the automatic transfer occurring from the credit card balance to a restricted funds card. In this way, the balance on the credit card obligation would be automatically increased each month (or other periodic time) while at the same time a restricted funds sub-account would be credited with a corresponding amount of funds.

While the invention has been disclosed in a preferred form, it will be apparent to those skilled in the art that many modifications, additions, and deletions can be made therein without departing from the scope and spirit of the invention as claimed.

What is claimed is:

1. A process for executing a payment transaction between a user and a merchant, the process being carried out in connection with a bank or other institution maintaining a financial account for the user, the process comprising the steps of:

(a) segmenting the financial account of the user into a first, unrestricted sub-account and a second, restricted sub-account;

(b) transferring funds from the first, unrestricted sub-account to the second, restricted sub-account;

(c) tendering a restricted funds bank card to the merchant for accessing restricted funds in the second sub-account;

(d) scanning the restricted funds bank card electronically to identify the account to be accessed;

(e) communicating a payment request from the merchant to the bank or other institution, the payment request identifying the account to be debited and the amount to be debited therefrom; and (f) evaluating the payment request and an instantaneous balance in the second sub-account of restricted funds and, if the second sub-account has sufficient funds to cover the payment requested, debiting the second sub-account by the amount requested for payment to the merchant.

2. A process as claimed in claim 1 wherein the financial account is an assets account.

3. A process as claimed in claim 1 wherein the financial account is an obligation account.

4. A process for executing a payment transaction between a user and a merchant, the process being carried out in connection with a bank or other institution maintaining a financial account for the user, the process comprising the steps of:

(a) segmenting the financial account of the user into a first, unrestricted sub-account and a second, restricted sub-account;

(b) transferring funds from the first, unrestricted sub-account to the second, restricted sub-account;

(c) receiving a communicated payment request from the merchant to the bank or other institution, the payment request identifying the account to be debited and the amount to be debited therefrom; and (d) evaluating the payment request and an instantaneous balance in the second sub-account of restricted funds and, if the second sub-account has sufficient funds to cover the payment requested, debiting the second sub-account by the amount requested for payment to the merchant.

* * * * *